US009342686B2

(12) United States Patent
Shang (10) Patent No.: US 9,342,686 B2
(45) Date of Patent: May 17, 2016

(54) SYSTEMS AND METHODS FOR UPDATING SCANNING RULES (71) Applicant: Tencent Technology (Shenzhen) Company Limited, Shenzhen (CN)

(72) Inventor: Hong Shang, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 7 days.

(21) Appl. No.: 14/097,718

(22) Filed: Dec. 5, 2013

(65) Prior Publication Data
US 2014/0096187 A1  Apr. 3, 2014

Related U.S. Application Data (63) Continuation of application No. PCT/CN2013/080181, filed on Jul. 26, 2013.

(30) Foreign Application Priority Data

Aug. 8, 2012 (CN) .......................... 2012 1 0280617

(51) Int. Cl.
G06F 21/56 (2013.01)
G06F 21/00 (2013.01)
G06F 21/50 (2013.01)
H04L 29/06 (2006.01)

(52) U.S. Cl.
CPC ............... *G06F 21/50* (2013.01); *G06F 21/56* (2013.01); *H04L 63/1425* (2013.01); *G06F 2221/2101* (2013.01)

(58) Field of Classification Search
CPC ...... H04L 63/14; G06F 21/56; G06N 99/005; G06N 5/048
USPC ....................................................... 726/22–25
See application file for complete search history.

(56) References Cited

U.S. PATENT DOCUMENTS

| 7,539,871 B1* | 5/2009 | Osborn ........................ 713/176 |
| 2003/0097378 A1 | 5/2003 | Pham et al. |
| 2010/0312644 A1* | 12/2010 | Borgs ..................... G06Q 10/10 705/14.55 |
| 2011/0047620 A1* | 2/2011 | Mahaffey et al. ............... 726/23 |
| 2011/0283358 A1 | 11/2011 | Cochin et al. |

FOREIGN PATENT DOCUMENTS

| CN | 101533365 A | 9/2009 |
| CN | 102214134 A | 10/2011 |

OTHER PUBLICATIONS

Patent Cooperation Treaty, The International Search Report and The Written Opinion of the International Searching Authority, mailed Oct. 31, 2013, in PCT/CN2013/080181.

(Continued)

Primary Examiner — Alexander Lagor
(74) Attorney, Agent, or Firm — Jones Day (57) ABSTRACT Systems and methods are provided for updating one or more scanning rules. For example, one or more first operation records being uploaded are obtained; scanning information corresponding to the first operation records is extracted; one or more recommended operations corresponding to the scanning information are obtained based on at least information associated with one or more scanning rules; a matching degree between the first operation records and the recommended operations is calculated; and the scanning rules are updated based on information associated with the matching degree.

16 Claims, 5 Drawing Sheets (56) References Cited

OTHER PUBLICATIONS

Korean Patent Office, Office Action issued Jun. 9, 2015, in Application No. 10-2014-7015121.

Korean Patent Office, Office Action issued Oct. 6, 2015, in Application No. 10-2014-7015121.

Patent Cooperation Treaty, International Preliminary Report on Patentability, PCT/CN2013/080181, Feb. 10, 2015.

* cited by examiner

SYSTEMS AND METHODS FOR UPDATING SCANNING RULES

CROSS-REFERENCES TO RELATED APPLICATIONS

This application is a continuation of International Application No. PCT/CN2013/080181, with an international filing date of Jul. 26, 2013, now pending, which claims priority to Chinese Patent Application No. 201210280617.4, filed Aug. 8, 2012, both applications being incorporated by reference herein for all purposes.

BACKGROUND OF THE INVENTION

The present invention is directed to computer technology. More particularly, the invention provides systems and methods for information processing. Merely by way of example, the invention has been applied to rules related to information processing. But it would be recognized that the invention has a much broader range of applicability.

Conventionally, a client terminal of a security software is often installed on a personal computer. When a user uses the client terminal of the security software to scan and kill viruses, the client terminal can often work with a server to actively or passively scan data on the personal computer, and thus ensure the security of the personal computer.

In a conventional cloud scan method, the client terminal of the security software may scan certain contents on the personal computer according to a set of predetermined validation rules and obtain scanning information which is then uploaded to the server. The scanned contents may include certain files and/or scanning points that may present system security risks. The files that may present system security risks usually include executable files or dll files, and the related validation rules are often based on calculating MD5 codes of these files. The scanning points usually include marker positions or entry positions set by the security software, such as the Start menu, system startup items, IE loading information, etc., and the related validation rules are often based on obtaining or calculating the configuration information of the scanning points.

Scanning rules are often stored on the server and define the relationship between the scanning information and corresponding recommended operations. The server may compare the scanning information and predetermined validation information. If the scanning information and the predetermined validation information do not match, the recommended operations corresponding to the scanning information may be returned based on certain predetermined scanning rules. The user of the client terminal may take actions based on the recommended operations.

However, conventionally, the scanning rules are often predetermined based on a small range of testing data obtained by one or more data-scanning service providers, and updated periodically on the server based on information associated with recently discovered viruses or Trojan horses. Such scanning rules may not be suitable for application environments of different user groups. In addition, such scanning rules may not be timely adapted for newly created files or scanning points, which often results in a high rate of false alarms and reduces data security.

Hence it is highly desirable to improve the techniques for updating scanning rules.

BRIEF SUMMARY OF THE INVENTION

The present invention is directed to computer technology. More particularly, the invention provides systems and methods for information processing. Merely by way of example, the invention has been applied to rules related to information processing. But it would be recognized that the invention has a much broader range of applicability.

According to one embodiment, a method for updating one or more scanning rules is provided. For example, one or more first operation records being uploaded are obtained; scanning information corresponding to the first operation records is extracted; one or more recommended operations corresponding to the scanning information are obtained based on at least information associated with one or more scanning rules; a matching degree between the first operation records and the recommended operations is calculated; and the scanning rules are updated based on information associated with the matching degree.

According to another embodiment, a device for updating scanning rules includes an operation-record-retrieving module, a recommended-operation-retrieving module, a matching-degree-calculation module, and a scanning-rule-update module. The operation-record-retrieving module is configured to obtain first operation records being uploaded to extract scanning information corresponding to the first operation records. The recommended-operation-retrieving module is configured to obtain one or more recommended operations corresponding to the scanning information based on at least information associated with one or more scanning rules. The matching-degree-calculation module is configured to calculate a matching degree between the first operation records and the recommended operations. The scanning-rule-update module is configured to update the scanning rules based on information associated with the matching degree.

In one embodiment, a non-transitory computer readable medium includes programming instructions for updating one or more scanning rules. The programming instructions are configured to cause a processing system to execute operations comprising: obtaining one or more first operation records being uploaded to extract scanning information corresponding to the first operation records; obtaining one or more recommended operations corresponding to the scanning information based on at least information associated with one or more scanning rules; calculating a matching degree between the first operation records and the recommended operations; and updating the scanning rules based on information associated with the matching degree.

In another embodiment, a computer-implemented system for updating one or more scanning rules includes one or more data processors and a computer readable storage medium. The computer-readable storage medium is encoded with instructions for commanding the data processors to execute operations including: obtaining one or more first operation records being uploaded to extract scanning information corresponding to the first operation records; obtaining one or more recommended operations corresponding to the scanning information based on at least information associated with one or more scanning rules; calculating a matching degree between the first operation records and the recommended operations; and updating the scanning rules based on information associated with the matching degree.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

The present invention is directed to computer technology. More particularly, the invention provides systems and methods for information processing. Merely by way of example, the invention has been applied to rules related to information processing. But it would be recognized that the invention has a much broader range of applicability.

Figure 1:
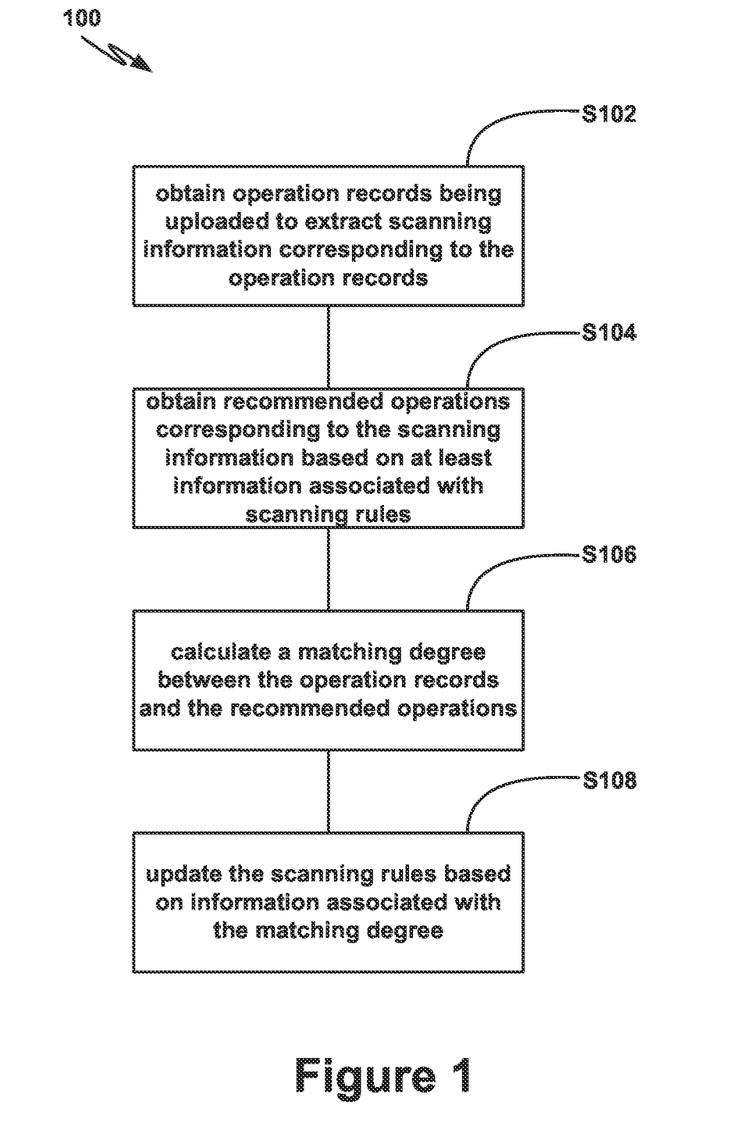
FIG. 1 is a simplified diagram showing a method for updating scanning rules according to one embodiment of the present invention.

FIG. 1 is a simplified diagram showing a method for updating scanning rules according to one embodiment of the present invention. This diagram is merely an example, which should not unduly limit the scope of the claims. One of ordinary skill in the art would recognize many variations, alternatives, and modifications. The method 100 for updating scanning rules includes at least a process S102 for obtaining operation records to extract scanning information corresponding to the operation records, a process S104 for obtaining recommended operations corresponding to the scanning information, a process S106 for calculating a matching degree between the operation records and the recommended operations, and a process S108 for updating the scanning rules based on information associated with the matching degree.

According to one embodiment, as shown in FIG. 1, at the process S102, certain uploaded operation records are obtained to extract scanning information corresponding to the operation records. An operation record is a record of a user's actions on a file that presents security risks based on scanning results provided to the user. As an example, the operation record includes the type of operation selected by the user, parameters related to the hardware environment and the software environment of a client terminal of the user, etc. For example, the scanning information includes validation information related to scanned contents which include certain files and/or scanning points. An operation record may be generated based on user commands for processing the scanned contents that present security risks, in some embodiments. Scanning user contents may include multiple processes, as shown in FIG. 2.

Figure 2:
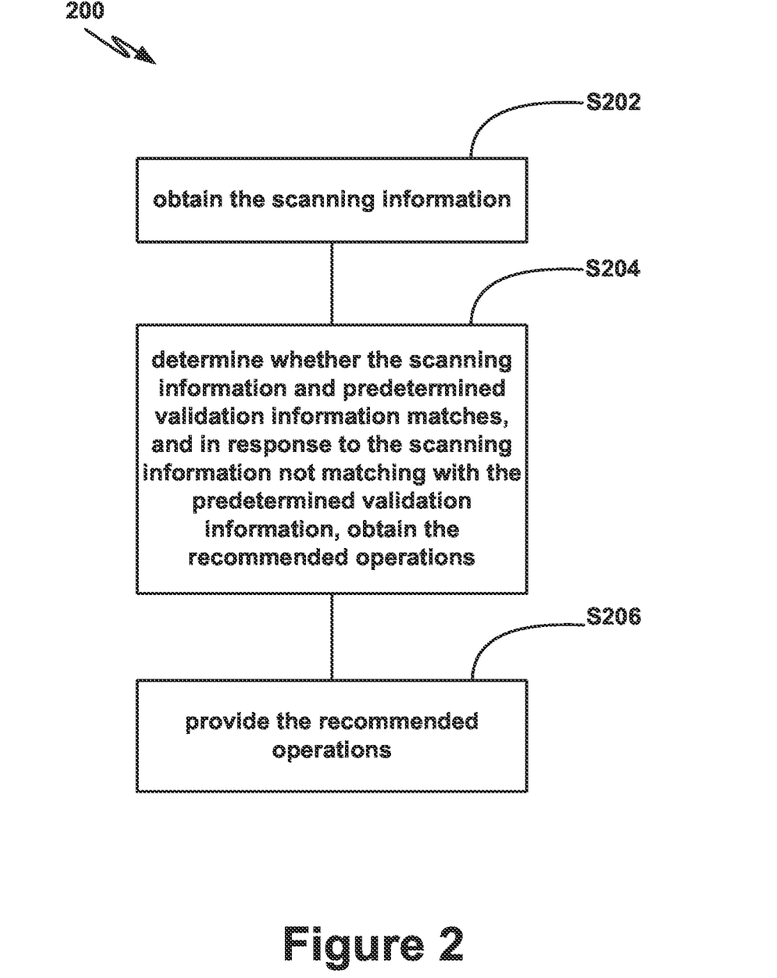
FIG. 2 is a simplified diagram showing a method for scanning user contents according to one embodiment of the present invention.

FIG. 2 is a simplified diagram showing a method for scanning user contents according to one embodiment of the present invention. This diagram is merely an example, which should not unduly limit the scope of the claims. One of ordinary skill in the art would recognize many variations, alternatives, and modifications. The method 200 for scanning user contents includes at least a process S202 for obtaining the scanning information, a process S204 for determining whether the scanning information and predetermined validation information matches, and in response to the scanning information not matching with the predetermined validation information, obtaining the recommended operations, a process S206 for providing the recommended operations.

For example, the scanning information includes MD5 codes of one or more files, and/or configuration information of one or more scanning points. The scanning information may be obtained by processing certain contents based on one or more predetermined validation rules. As an example, the validation rules for the contents of a file type include calculating MD5 codes of such contents. For the contents of a scanning-point type, the related validation rules include obtaining or calculating the configuration information of such contents. For example, whether the scanning information matches with the predetermined validation information is determined by comparing the MD5 codes or the configuration information related to the scanned contents.

It is noted that the process for determining whether the scanning information matches with the predetermined validation information may be performed on a client terminal or a server, according to certain embodiments. For example, when such process is performed on a server, the client terminal calculates the scanning information of the contents being scanned and uploads the scanning information to the server which then performs the validation of the scanning information.

In one embodiment, the recommended operations include a removal operation and a trust operation. For example, the removal operation and the trust operation are opposite to each other. As an example, a client terminal may display the recommended operation through a popup window to prompt a user to take related actions. The scanning information that does not match with the validation information may correspond to the scanned contents that present security risks. For example, the client terminal may provide in the popup window the names and positions of the scanned contents, the scanning time and the recommended operations, and display three buttons corresponding to a removal operation, a trust operation and an ignore operation respectively.

In another embodiment, an operation record contains an actual operation selected by the user based on the recommended operations. For example, if the recommended operation is a removal operation, the user believes it is a false alarm and clicks the button corresponding to the trust operation. Then, the operation record includes the trust operation as the actual operation selected by the user. In another example, if the user is not sure and selects a button corresponding to the ignore operation, the operation record includes the ignore operation as the actual operation selected by the user.

Figure 3:
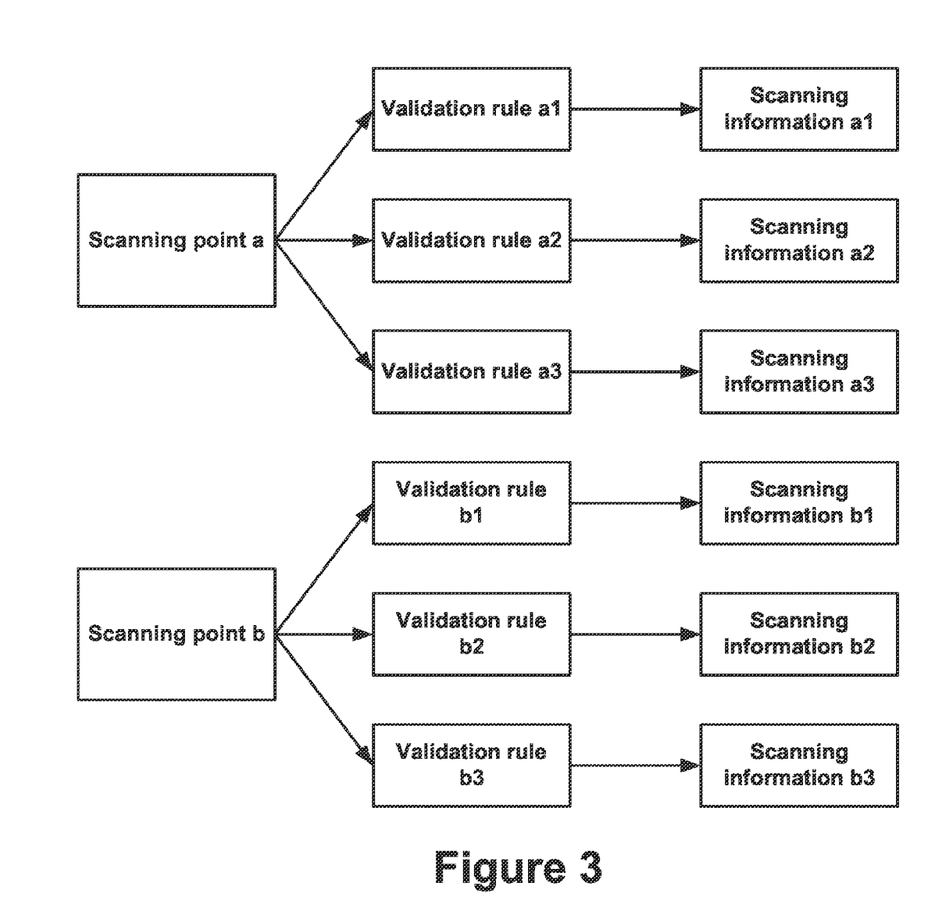
FIG. 3 is a simplified diagram showing a scanning point including multiple pieces of scanning information based on multiple validation rules respectively according to one embodiment of the present invention.

In yet another embodiment, the scanned contents includes multiple pieces of scanning information corresponding to multiple predetermined validation information respectively, as shown in FIG. 3.

FIG. 3 is a simplified diagram showing a scanning point including multiple pieces of scanning information based on multiple validation rules respectively according to one embodiment of the present invention. This diagram is merely an example, which should not unduly limit the scope of the claims. One of ordinary skill in the art would recognize many variations, alternatives, and modifications. As shown in FIG. 3, the scanning point a corresponds to three validation rules a1, a2 and a3, according to certain embodiments. That is, the scanning point a may be scanned using three different scanning methods to obtain scanning information. For example, the validation rules include comparing the number of files, comparing the sizes of files, and comparing the index levels of the files.

Referring back to FIG. 1, the process S104 includes obtaining recommended operations corresponding to the scanning information based on at least information associated with one or more scanning rules, according to certain embodiments. In one embodiment, recommended operations corresponding to the scanning information may be set initially through a test environment. For example, the initial recommended operation is set based on the characteristics of files infected by certain viruses, and included in the scanning rules.

Table 1 shows certain scanning rules and actual operations.

TABLE 1

| File name | Validation results | Recommended operations | Actual operations |
|---|---|---|---|
| File 1 | Risky | Remove | Trust |
| File 2 | Risky | Remove | Remove |
| File 3 | Normal | Trust | Trust |
| File 4 | Normal | Trust | Remove |

For example, the first three columns of Table 1 show certain scanning rules. In addition, the column "actual operations" is extracted from certain operation records and indicates particular operations selected by a user based on the recommended operations. As an example, the column "validation results" includes the comparison results of the scanning information and the predetermined validation information, where "risky" indicates the scanning information matches with the predetermined validation information and "normal" indicates a mismatch.

Table 2 shows a relationship between the received operation records and corresponding scanning rules. According to one embodiment, as shown in Table 2, the column "User type" is used to distinguish scanning rules for different types of users. For example, the column "Validation rules" is used to determine the relationship between the scanned contents and the scanning information. As an example, the validation rules for the files being scanned are based on calculating and comparing hash values of the files (e.g., MD5 codes). That is, the validation rules a, d and e may be the same. In another example, the column "Recommended operation" includes the recommended operations corresponding to the scanning information defined by the scanning rules. The column "Actual operation" includes the actual operations selected by the user.

TABLE 2

| User type | Scanned contents | Validation rules | Scanning information | Match | Recommended operation | Actual operation |
|---|---|---|---|---|---|---|
| Type 1 | File a | Validation rule a | Scanning information a | Normal | Trust | Ignore |
| Type 2 | File a | Validation rule a | Scanning information a | Risky | Remove | Ignore |
| Type 2 | Scan point a | Validation rule b1 | Scanning information b1 | Risky | Remove | Trust |
| Type 1 | Scan point b | Validation rule b3 | Scanning information b3 | Risky | Remove | Remove |
| Type 2 | Scan point c | Validation rule c2 | Scanning information c2 | Normal | Trust | Trust |
| Type 2 | File d | Validation rule d | Scanning information d | Normal | Trust | Trust |
| Type 3 | File e | Validation rule e | Scanning information e | Risky | Remove | Remove |

It is noted that Table 1 and Table 2 are merely examples for the purpose of illustrating the relationship between the scanning information defined by the scanning rules and corresponding recommended operations. Such tables may not be necessary in the actual processes and/or the actual products.

Referring back to FIG. 1, at the process S106, a matching degree between the operation records and the recommended operations is calculated, according to some embodiments. For example, the matching degree includes a degree of support. As an example, the process for calculating a matching degree between the operation records and the recommended operations includes: obtaining a first number of one or more first users (e.g., type users) associated with a user type related to certain operation records; obtaining a second number of one or more second users (e.g., event users) among the first users, where the operation records related to the second users correspond to the scanning information; and calculating the degree of support based on at least information associated with the second number and the first number.

In one embodiment, the degree of support indicates, among a user group of a particular type, a proportion of users (e.g., event users) whose operation records correspond to certain scanning information. Under normal circumstances, the operation records of the users may be created and uploaded only when the scanning information indicates security risks, and thus this proportion of users (e.g., event users) may indicate a range of users who may be affected by the security risks related to the scanning information, according to certain embodiments.

In another embodiment, the matching degree also includes a degree of trust. For example, after the second number of the second users is obtained, the process related to the degree of trust includes: obtaining the recommended operations corresponding to the scanning information; obtaining a third number of one or more third users (e.g., trust users) among the second users (e.g., event users), where operation records related to the third users match with the recommended operations; and calculating the degree of trust based on at least information associated with the third number and the second number. As an example, the degree of trust indicates a proportion of event users who agree with the recommended operations. A high degree of trust indicates that a large number of users agree with the recommended operations, which demonstrates a low rate of false alarms, according to certain embodiments.

In yet another embodiment, the matching degree further includes the degree of doubt. For example, after the second number of the second users is obtained, the process related to the degree of doubt includes: obtaining one or more second operations opposite to the recommended operations corresponding to the scanning information; obtaining a fourth number of one or more fourth users (e.g., doubt users) among the second users (e.g., event users), where the operation records related to the fourth users match with the second operations; and calculating the degree of doubt based on at least information associated with the fourth number and the second number. As an example, the degree of doubt indicates a proportion of event users who disagree with the recommended operations. A high degree of doubt indicates that a large number of users disagree with the recommended operations, which demonstrates a high rate of false alarms.

For example, if the number of all users is N and the number of the users of a particular type (e.g., type users) is $N_u$, the number of users (e.g., event users) whose operation records are uploaded and correspond to a particular scanning information i is $N_{ui}$, where $N_{ui}$ is a subset of $N_u$. The degree of support may be calculated based on $N_{ui}/N_u$. As an example, among the event users, the number of users whose operation records include one or more trust operations is $N_{uia}$, and the number of users whose operation records include one or more removal operations is $N_{uid}$, $N_{uia}+N_{uid}<N_{ui}$ because some users may select the ignore operation, according to certain embodiments.

For example, if the recommended operation is the trust operation, $N_{uia}$ represents the number of trust users, and $N_{uid}$ represents the number of doubt users. The degree of trust may be calculated based on $N_{uia}/N_{ui}$, and the degree of doubt may be calculated based on $N_{uid}/N_{ui}$. In another example, if the recommended operation is the removal operation, $N_{uid}$ represents the number of trust users, and $N_{uia}$ represents the number of doubt users. The degree of trust may be calculated based on $N_{uid}/N_{ui}$, and the degree of doubt may be calculated based on $N_{uia}/N_{ui}$.

It is noted that the process for obtaining the number of type users, the process for obtaining the number of event users, the process for obtaining the number of trust users, and the process for obtaining the number of doubt users described above do not require a strict order of execution, according to certain embodiments. The process for calculating the degree of support, the process for calculating the degree of trust, and the process for calculating the degree of doubt described above do not require a strict order of execution, according to some embodiments. For example, the process for calculating the degree of support, the process for calculating the degree of trust, and the process for calculating the degree of doubt may be executed at a same time, or be executed in any order as needed.

In one embodiment, after the uploaded operation records are obtained, the number of the type users, the number of the event users, the number of users selecting the trust operation, and the number of users selecting the removal operation may be updated based on at least information associated with the obtained operation records. For example, the number of users selecting the trust operation is equal to the number of users among the event users whose operation records include the trust operation. In another example, the number of users selecting the removal operation is equal to the number of users among the event users whose operation records include the removal operation. In yet another example, if the recommended operation is the trust operation, the number of users selecting the trust operation represents the number of the trust users, and the number of users selecting the removal operation represents the number of the doubt users. In yet another example, if the recommended operation is the removal operation, the number of users selecting the trust operation represents the number of the doubt users, and the number of users selecting the removal operation represents the number of the trust users.

In another embodiment, a cumulative method is used to update the number of the type users, the number of the event users, the number of users selecting the trust operation, and the number of users selecting the removal operation. For example, a user type is extracted from certain operation records, and the number of users associated with the user type is obtained through aggregation. In another example, among the type users, the number of certain event users is obtained through aggregation based on the scanning information. In yet another example, a type of an actual operation included in the operation records is determined. If the actual operation is the trust operation, the number of event users who select the trust operation may be obtained through aggregation, and if the actual operation is the removal operation, the number of event users who select the removal operation may be obtained through aggregation, according to some embodiments. In another embodiment, if the actual operation is the ignore operation, no action is needed.

Referring back to FIG. 1, the process S108 includes updating the scanning rules based on information associated with the matching degree, according to certain embodiments. For example, the matching degree includes the degree of support, the degree of trust and the degree of doubt. As an example, the process for updating the scanning rules based on information associated with the matching degree includes: in response to the degree of support being larger than a support threshold, the degree of trust being smaller than a trust threshold, and the degree of doubt being larger than a doubt threshold, replacing the recommended operations with the second operations.

For example, if the recommended operation is the trust operation, change the recommended operation corresponding to the scanning information to the removal operation, when the degree of support $N_{ui}/N_u$ is larger than 0.9, the degree of trust $N_{uia}/N_{ui}$ is smaller than 0.2, and the degree of doubt $N_{uid}/N_{ui}$ is larger than 0.6. That is, among the user group of a particular user type, when popup windows appear to indicate security risks for a larger number of users (e.g., the degree of support being larger than the support threshold), a small proportion of these users actually select the recommended operation (e.g., the degree of trust being smaller than the trust threshold), while a large proportion of these users select an actual operation opposite to the recommended operation (e.g., the degree of doubt being larger than the doubt threshold). Then, the recommended operation in the scanning rules that corresponds to the scanning information can be updated to an opposite operation.

In one embodiment, after the uploaded scanning information is obtained, it is determined whether there is any predetermined validation information corresponding to the scanning information. For example, if the predetermined validation information corresponding to the scanning information exists, it is determined whether the scanning information and the predetermined validation information matches. In another example, if the predetermined validation information corresponding to the scanning information does not exist, one or more recommended operations are obtained based on one or more weights by comparing the number of users selecting the trust operation and the number of users selecting the removal operation.

According to one embodiment, for unknown scanned contents, i.e., unknown or newly created files and/or scanning points, two ratios are obtained, including a ratio between the number of the users selecting the trust operation and the number of all event users and another ratio between the number of users selecting the removal operation and the number of all event users. For example, one or more weights are applied to these two ratios to generate two weighted ratios, and a difference between the weighted ratios is calculated for obtaining and returning the recommended operations.

For example, the proportion of users who select the trust operation among the event users is $N_{uia}/N_{ui}$, and the proportion of users who select the removal operation among the event users is $N_{uid}/N_{ui}$. As an example, an intermediate result T is determined as follows:

$$T = a \times \frac{N_{uia}}{N_{ui}} - (1-a) \times \frac{N_{uid}}{N_{ui}}$$

where a and (1−a) represent two weights. For example, if the intermediate result T is larger than a threshold (e.g., 0), the recommended operation is the trust operation, and if the intermediate result T is smaller than the threshold, the recommended operation is the removal operation.

Figure 4:
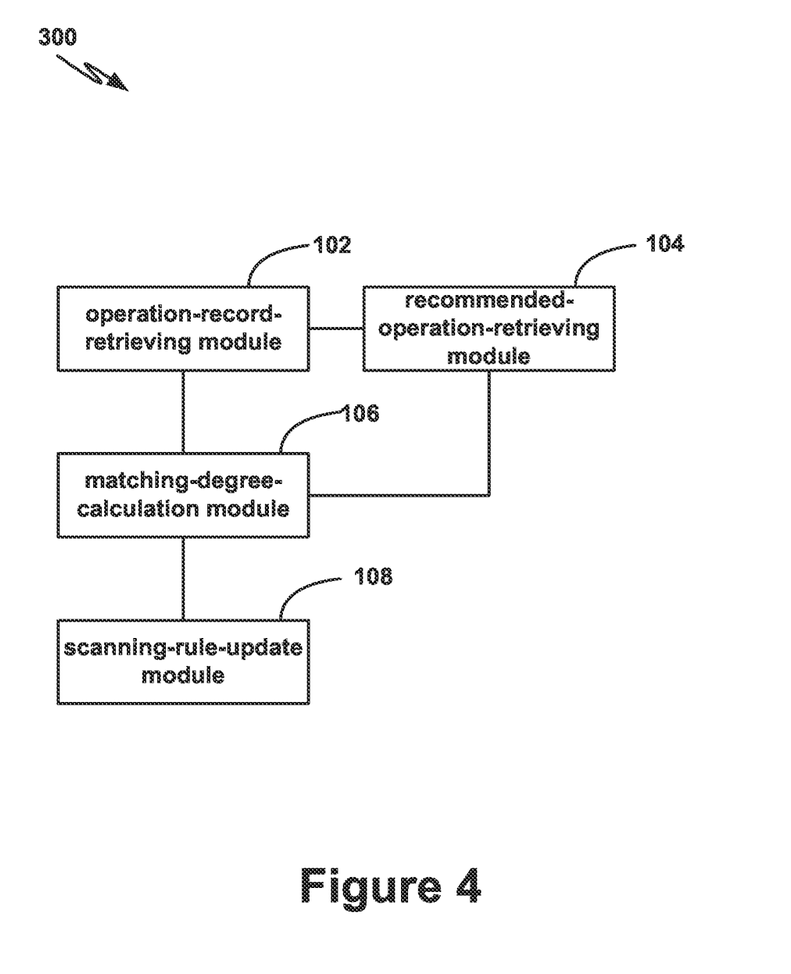
FIG. 4 is a simplified diagram showing certain components of a device for updating scanning rules according to one embodiment of the present invention.

FIG. 4 is a simplified diagram showing certain components of a device for updating scanning rules according to one embodiment of the present invention. This diagram is merely an example, which should not unduly limit the scope of the claims. One of ordinary skill in the art would recognize many variations, alternatives, and modifications. As shown in FIG. 4, the device 400 includes an operation-record-retrieving module 102, a recommended-operation-retrieving module 104, a matching-degree-calculation module 106, and a scanning-rule-update module 108.

According to one embodiment, the operation-record-retrieving module 102 is configured to obtain operation records being uploaded to extract scanning information corresponding to the first operation records. An operation record is a record of a user's actions on a file that presents a security risk based on a scanning result provided to the user. As an example, the operation record includes the type of operation selected by the user, parameters related to the hardware environment and the software environment of a client terminal of the user, etc. For example, the scanning information includes validation information related to scanned contents which include certain files and/or scanning points.

Figure 5:
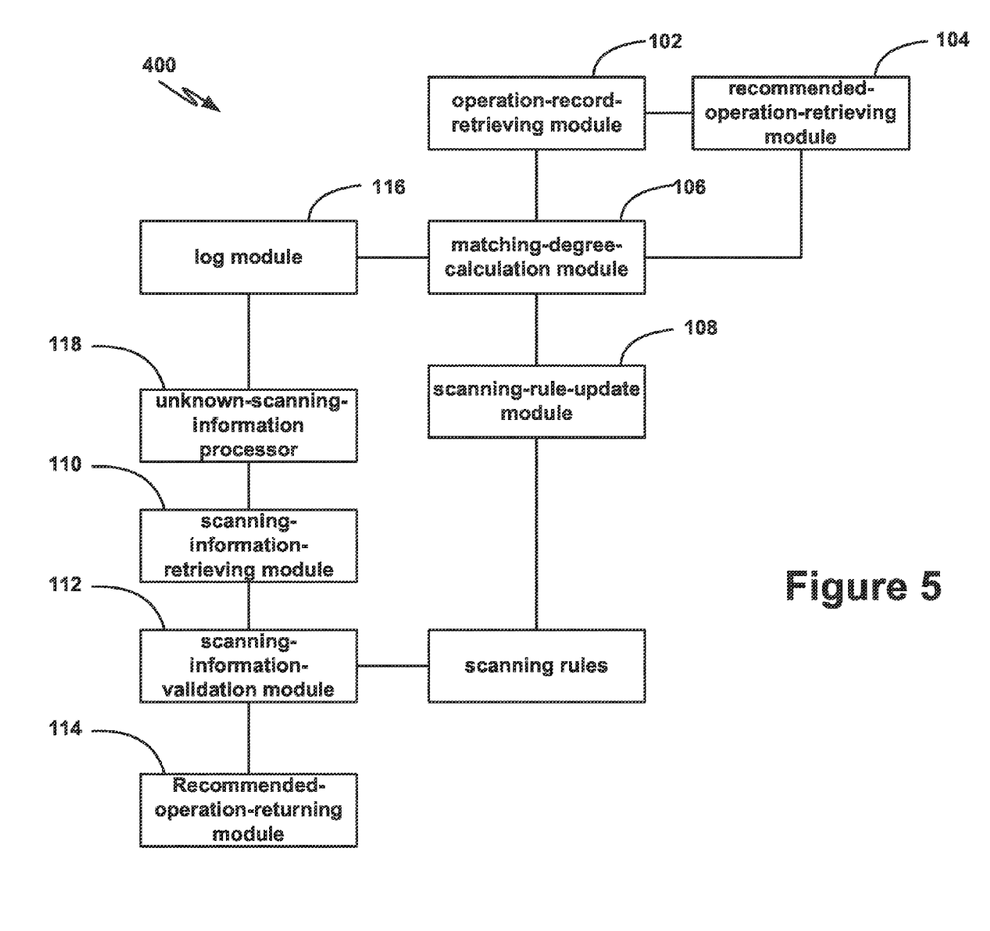
FIG. 5 is a simplified diagram showing certain components of a device for updating scanning rules according to another embodiment of the present invention.

FIG. 5 is a simplified diagram showing certain components of the device 400 according to another embodiment of the present invention. This diagram is merely an example, which should not unduly limit the scope of the claims. One of ordinary skill in the art would recognize many variations, alternatives, and modifications. The device 400 further includes a scanning-information-retrieving module 110, a scanning-information-validation module 112, and a recommended-operation-returning module 114. For example, the scanning-information-retrieving module 110 is configured to obtain the scanning information. The scanning-information-validation module 112 is configured to determine whether the scanning information and predetermined validation information matches and, in response to the scanning information not matching with the predetermined validation information, obtain the recommended operations. The recommended-operation-returning module 114 is configured to provide the recommended operations.

According to one embodiment, certain contents are processed through the scanning-information-retrieving module 110, the scanning-information-validation module 112, and the recommended-operation-returning module 114. For example, an operation record is generated based on the user's input commands for processing the scanned contents that present security risks. The scanning information may include MD5 codes of one or more files, and/or configuration information of one or more scanning points. In another example, the scanning-information-retrieving module 110 is configured to process the contents based on one or more predetermined validation rules to obtain scanning information. As an example, the validation rules for the contents of a file type include calculating MD5 codes of such contents. For the contents of a scanning-point type, the related validation rules include obtaining or calculating the configuration information of such contents. For example, the scanning-information-validation module 112 is configured to determine whether the scanning information matches with the predetermined validation information by comparing the MD5 codes or the configuration information.

It is noted that the scanning-information-validation module 112 can reside on a client terminal or on a server, according to some embodiments. For example, if the scanning-information-validation module 112 resides on a server, the scanning-information-retrieving module 110 that resides on a client terminal calculates the scanning information of the scanned contents and uploads the scanning information to the scanning-information-validation module 112 on the server. The scanning-information-validation module 112 then performs the validation of the scanning information.

In one embodiment, the recommended operations include a removal operation and a trust operation. For example, the removal operation and the trust operation are opposite to each other. As an example, a client terminal may display the recommended operation through a popup window to prompt a user to take related actions. The scanning information that does not match with the validation information may correspond to the scanned contents that present security risks. For example, the client terminal may provide in the popup window the names and positions of the scanned contents, the scanning time and the recommended operations, and display three buttons corresponding to a removal operation, a trust operation and an ignore operation respectively.

In another embodiment, an operation record contains an actual operation selected by the user based on the recommended operations. For example, if the recommended operation is a removal operation, the user believes it is a false alarm and clicks the button corresponding to the trust operation. Then, the operation record includes the trust operation as the actual operation selected by the user. In another example, if the user is not sure and selects a button corresponding to the ignore operation, the operation record includes the ignore operation as the actual operation selected by the user.

In yet another embodiment, the scanned contents includes multiple pieces of scanning information corresponding to multiple predetermined validation information respectively, as shown in FIG. 3. As shown in FIG. 3, the scanning point a corresponds to three validation rules a1, a2 and a3, according to certain embodiments. That is, the scanning point a may be scanned using three different scanning methods to obtain scanning information. For example, the validation rules include comparing the number of files, comparing the sizes of files, and comparing the index levels of the files.

According to one embodiment, the recommended-operation-retrieving module 104 is configured to obtain recommended operations corresponding to the scanning information based on at least information associated with one or more scanning rules. For example, recommended operations corresponding to the scanning information may be set initially through a test environment. In another example, the initial recommended operation is set based on the characteristics of files infected by certain viruses, and included in the scanning rules.

Table 3 shows certain scanning rules and actual operations.

TABLE 3

| File name | Validation results | Recommended operations | Actual operations |
|---|---|---|---|
| File 1 | Risky | Remove | Trust |
| File 2 | Risky | Remove | Remove |
| File 3 | Normal | Trust | Trust |
| File 4 | Normal | Trust | Remove |

For example, the first three columns of Table 3 show certain scanning rules. In addition, the column "actual operations" is extracted from certain operation records and indicates particular operations selected by a user based on the recommended operations. As an example, the column "validation results" includes the comparison results of the scanning information and the predetermined validation information, where "risky" indicates the scanning information matches with the predetermined validation information and "normal" indicates a mismatch.

Table 4 shows a relationship between the received operation records and corresponding scanning rules. According to one embodiment, as shown in Table 4, the column "User type" is used to distinguish scanning rules for different types of users. For example, the column "Validation rules" is used to determine the relationship between the scanned contents and the scanning information. As an example, the validation rules for the files being scanned are based on calculating and comparing hash values of the files (e.g., MD5 codes). That is, the validation rules a, d and e may be the same. In another example, the column "Recommended operation" includes the recommended operations corresponding to the scanning information defined by the scanning rules. The column "Actual operation" includes the actual operations selected by the user.

TABLE 4

| User type | Scanned contents | Validation rules | Scanning information | Match | Recommended operation | Actual operation |
|---|---|---|---|---|---|---|
| Type 1 | File a | Validation rule a | Scanning information a | Normal | Trust | Ignore |
| Type 2 | File a | Validation rule a | Scanning information a | Risky | Remove | Ignore |
| Type 2 | Scan point a | Validation rule b1 | Scanning information b1 | Risky | Remove | Trust |
| Type 1 | Scan point b | Validation rule b3 | Scanning information b3 | Risky | Remove | Remove |
| Type 2 | Scan point c | Validation rule c2 | Scanning information c2 | Normal | Trust | Trust |
| Type 2 | File d | Validation rule d | Scanning information d | Normal | Trust | Trust |
| Type 3 | File e | Validation rule e | Scanning information e | Risky | Remove | Remove |

It is noted that Table 3 and Table 4 are merely examples for the purpose of illustrating the relationship between the scanning information defined by the scanning rules and corresponding recommended operations. Such tables may not be necessary in the actual processes and/or the actual products.

According to another embodiment, the matching-degree-calculation module 106 is configured to calculate a matching degree between the operation records and the recommended operations. For example, the matching degree includes a degree of support. As an example, the matching-degree-calculation module 106 is configured to obtain a first number of one or more first users (e.g., type users) associated with a user type related to certain operation records; obtain a second number of one or more second users (e.g., event users) among the first users, where the operation records related to the second users correspond to the scanning information; and calculate the degree of support based on at least information associated with the second number and the first number.

In one embodiment, the degree of support indicates, among a user group of a particular type, a proportion of users (e.g., event users) whose operation records correspond to certain scanning information. Under normal circumstances, the operation records of the users may be created and uploaded only when the scanning information indicates security risks, and thus this proportion of users (e.g., event users) may indicate a range of users who may be affected by the security risks related to the scanning information, according to certain embodiments.

In another embodiment, the matching degree also includes a degree of trust. For example, the matching-degree-calculation module 106 is configured to obtain the recommended operations corresponding to the scanning information; obtain a third number of one or more third users (e.g., trust users) among the second users (e.g., event users), where operation records related to the third users match with the recommended operations; and calculate the degree of trust based on at least information associated with the third number and the second number. As an example, the degree of trust indicates a proportion of event users who agree with the recommended operations. A high degree of trust indicates that a large number of users agree with the recommended operations, which demonstrates a low rate of false alarms, according to certain embodiments.

In yet another embodiment, the matching degree further includes the degree of doubt. For example, the matching-degree-calculation module 106 is configured to obtain one or more second operations opposite to the recommended operations corresponding to the scanning information; obtain a fourth number of one or more fourth users (e.g., doubt users) among the second users (e.g., event users), where the operation records related to the fourth users match with the second operations; and calculate the degree of doubt based on at least information associated with the fourth number and the second number. As an example, the degree of doubt indicates a proportion of event users who disagree with the recommended operations. A high degree of doubt indicates that a large number of users disagree with the recommended operations, which demonstrates a high rate of false alarms.

For example, if the number of all users is N and the number of the users of a particular type (e.g., type users) is $N_u$, the number of users (e.g., event users) whose operation records are uploaded and correspond to a particular scanning information i is $N_{ui}$, where $N_{ui}$ is a subset of $N_u$. In one embodiment, the matching-degree-calculation module 106 is configured to calculate the degree of support based on $N_{ui}/N_u$. As an example, among the event users, the number of users whose operation records include one or more trust operations is $N_{uia}$, and the number of users whose operation records include one or more removal operations is $N_{uid}$. $N_{uia}+N_{uid}<N_{ui}$ because some users may select the ignore operation, according to certain embodiments.

For example, if the recommended operation is the trust operation, $N_{uia}$ represents the number of trust users, and $N_{uid}$ represents the number of doubt users. In one embodiment, the matching-degree-calculation module 106 is configured to calculate the degree of trust based on $N_{uia}/N_{ui}$, and calculate the degree of doubt based on $N_{uid}/N_{ui}$. In another example, if the recommended operation is the removal operation, $N_{uid}$ represents the number of trust users, and $N_{uia}$ represents the number of doubt users. In another embodiment, the matching-degree-calculation module 106 is configured to calculate the degree of trust based on $N_{uid}/N_{ui}$, and calculate the degree of doubt based on $N_{uia}/N_{ui}$.

It is noted that it is not required that the matching-degree-calculation module 106 follow a strict order of execution to obtain the number of type users, obtain the number of event users, obtain the number of trust users, and obtain the number of doubt users, according to some embodiments. It is not required that the matching-degree-calculation module 106 follow a strict order of execution to calculate the degree of support, calculate the degree of trust, and calculate the degree of doubt described above do not require a strict order of execution, according to certain embodiments. For example, the matching-degree-calculation module 106 is configured to calculate the degree of support, calculate the degree of trust, and calculate the degree of doubt at a same time, or in any order as needed.

Referring to FIG. 5, the device 400 further includes a log module 116 configured to update the number of the type users, the number of the event users, the number of users selecting the trust operation, and the number of users selecting the removal operation based on at least information associated with the obtained operation records, according to certain embodiments. For example, the number of users selecting the trust operation is equal to the number of users among the event users whose operation records include the trust operation. In another example, the number of users selecting the removal operation is equal to the number of users among the event users whose operation records include the removal operation. In yet another example, if the recommended operation is the trust operation, the number of users selecting the trust operation represents the number of the trust users, and the number of users selecting the removal operation represents the number of the doubt users. In yet another example, if the recommended operation is the removal operation, the number of users selecting the trust operation represents the number of the doubt users, and the number of users selecting the removal operation represents the number of the trust users.

In one embodiment, the log module 116 is configured to use a cumulative method to update the number of the type users, the number of the event users, the number of users selecting the trust operation, and the number of users selecting the removal operation. For example, the log module 116 is configured to extract a user type from certain operation records, and obtain the number of users of the user type through aggregation. In another example, the log module 116 is configured to obtain the number of certain event users among the type users through aggregation based on the scanning information. In yet another example, the log module 116 is configured to determine a type of actual operation included in the operation records. As an example, if the actual operation is the trust operation, the log module 116 is configured to increase cumulatively the number of event users who select the trust operation. If the actual operation is the removal operation, the log module 116 is configured to increase cumulatively the number of event users who select the removal operation, according to some embodiments. In another embodiment, if the actual operation is the ignore operation, no action is needed.

According to one embodiment, the scanning-rule-update module 108 is configured to update the scanning rules based on information associated with the matching degree. For example, the matching degree includes the degree of support, the degree of trust and the degree of doubt. As an example, the scanning-rule-update module 108 is configured to, in response to the degree of support being larger than a support threshold, the degree of trust being smaller than a trust threshold, and the degree of doubt being larger than a doubt threshold, replace the recommended operations with the second operations.

For example, if the recommended operation is the trust operation, change the recommended operation corresponding to the scanning information to the removal operation, when the degree of support $N_{ui}/N_u$ is larger than 0.9, the degree of trust $N_{uia}/N_{ui}$ is smaller than 0.2, and the degree of doubt $N_{uid}/N_{ui}$ is larger than 0.6. That is, among the user group of a particular user type, when popup windows appear to indicate security risks for a larger number of users (e.g., the degree of support being larger than the support threshold), a small proportion of these users select the recommended operation as the actual operation (e.g., the degree of trust being smaller than the trust threshold), while a large proportion of these users select an actual operation opposite to the recommended operation (e.g., the degree of doubt being larger than the doubt threshold). Then, the scanning-rule-update module 108 is configured to change the recommended operation in the scanning rules that corresponds to the scanning information to an opposite operation, according to certain embodiments.

In one embodiment, the device 400 further includes an unknown-scanning-information processor 118 configured to determine whether there is any predetermined validation information corresponding to the scanning information. For example, if the predetermined validation information corresponding to the scanning information does not exist, the unknown-scanning-information processor 118 is configured to obtain one or more recommended operations based on one or more weights by comparing the number of users selecting the trust operation and the number of users selecting the removal operation.

According to one embodiment, for unknown scanned contents, i.e., unknown or newly created files and/or scanning points, two ratios are obtained, including a ratio of between the number of the users selecting the trust operation and the number of all event users and another ratio between the number of users selecting the removal operation and the number of all event users. For example, one or more weights are applied to these two ratios to generate two weighted ratios, respectively, and a difference between the weighted ratios is calculated for obtaining and returning the recommended operations.

For example, the proportion of users who select the trust operation among the event users is $N_{uia}/N_{ui}$, and the proportion of users who select the removal operation among the event users is $N_{uid}/N_{ui}$. As an example, an intermediate result T is determined as follows:

$$T = a \times \frac{N_{uia}}{N_{ui}} - (1-a) \times \frac{N_{uid}}{N_{ui}}$$

where a and (1−a) represent two weights. For example, if the intermediate result T is larger than a threshold (e.g., 0), the recommended operation is the trust operation, and if the intermediate result T is smaller than the threshold, the recommended operation is the removal operation.

It is noted that the device 400 for updating scanning rules may reside on a single server, or on one or more service nodes of a cloud server for cloud scanning, according to certain embodiments. In some embodiments, part of the device 400 may, reside on a P2P server, and part of the device 400 may reside on a P2P client terminal.

According to one embodiment, a method for updating one or more scanning rules is provided. For example, one or more first operation records being uploaded are obtained; scanning information corresponding to the first operation records is extracted; one or more recommended operations corresponding to the scanning information are obtained based on at least information associated with one or more scanning rules; a matching degree between the first operation records and the recommended operations is calculated; and the scanning rules are updated based on information associated with the matching degree. For example, the method is implemented according to at least FIG. 1, FIG. 4, and/or FIG. 5.

According to another embodiment, a device for updating scanning rules includes an operation-record-retrieving module, a recommended-operation-retrieving module, a matching-degree-calculation module, and a scanning-rule-update module. The operation-record-retrieving module is configured to obtain first operation records being uploaded to extract scanning information corresponding to the first operation records. The recommended-operation-retrieving module is configured to obtain one or more recommended operations corresponding to the scanning information based on at least information associated with one or more scanning rules. The matching-degree-calculation module is configured to calculate a matching degree between the first operation records and the recommended operations. The scanning-rule-update module is configured to update the scanning rules based on information associated with the matching degree. For example, the device is implemented according to at least FIG. 1, FIG. 4, and/or FIG. 5.

In one embodiment, a non-transitory computer readable storage medium includes programming instructions for updating one or more scanning rules. The programming instructions are configured to cause a processing system to execute operations comprising: obtaining one or more first operation records being uploaded to extract scanning information corresponding to the first operation records; obtaining one or more recommended operations corresponding to the scanning information based on at least information associated with one or more scanning rules; calculating a matching degree between the first operation records and the recommended operations; and updating the scanning rules based on information associated with the matching degree. For example, the storage medium is implemented according to at least FIG. 1, FIG. 4, and/or FIG. 5.

In another embodiment, a computer-implemented system for updating one or more scanning rules includes one or more data processors and a computer readable storage medium. The computer-readable storage medium is encoded with instructions for commanding the data processors to execute operations including: obtaining one or more first operation records being uploaded to extract scanning information corresponding to the first operation records; obtaining one or more recommended operations corresponding to the scanning information based on at least information associated with one or more scanning rules; calculating a matching degree between the first operation records and the recommended operations; and updating the scanning rules based on information associated with the matching degree. For example, the system is implemented according to at least FIG. 1, FIG. 4, and/or FIG. 5.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A processor-implemented method for updating one or more scanning rules for scanning contents to detect security risks, the method comprising:
   obtaining, using one or more data processors, one or more first operation records to extract scanning information related to contents being scanned to detect security risks, the first operation records including one or more user selected operations related to the contents being scanned;
   obtaining, using the one or more data processors, one or more recommended operations corresponding to the scanning information based on at least information associated with one or more scanning rules;
   determining whether predetermined validation information corresponding to the scanning information exists;
   in response to the predetermined validation information existing, determining whether the scanning information and the predetermined validation information matches;
   wherein the obtaining one or more recommended operations includes:
      in response to the scanning information matching with the predetermined validation information, obtaining a removal operation as the recommended operations; and
      in response to the scanning information not matching with the predetermined validation information, obtaining a trust operation as the recommended operations;
   in response to the predetermined validation information not existing,
      determining one or more first users selecting the trust operation;
      determining one or more second users selecting the removal operation; and
      obtaining the recommended operations based at least in part on the first users and the second users;
   wherein the obtaining the recommended operations based at least in part on the first users and the second users includes:
      obtaining one or more third users associated with a user type related to the first operation records;
      obtaining one or more fourth users among the third users, second operation records related to the event users corresponding to the scanning information;
      calculating a first ratio between a first number of the first users and a fourth number of the fourth users;
      calculating a second ratio between a second number of the second users and the fourth number;
      applying one or more first weights to the first ratio to generate a first weight ratio;
      applying one or more second weights to the second ratio to generate a second weight ratio;
      calculating a difference between the first weight ratio and the second weight ratio; and
      determining the recommended operations based at least in part on the difference between the first weight ratio and the second weight ratio; and
   calculating, using the one or more data processors, a matching degree between the first operation records and the recommended operations based at least in part on a comparison between the user selected operations and the recommended operations; and
   updating, using the one or more data processors, the scanning rules based on information associated with the matching degree.

2. The method of claim 1 wherein:
   the recommended operations include a removal operation if the scanning information matches with the predetermined validation information; and
   the recommended operations include a trust operation if the scanning information does not match with the predetermined validation information, the removal operation being different from the trust operation.

3. The method of claim 1 wherein:
the matching degree includes a degree of support;
the calculating a matching degree between the first operation records and the recommended operations includes:
obtaining one or more first users associated with a user type related to the first operation records;
obtaining one or more second users among the first users, second operation records related to the second users corresponding to the scanning information; and
calculating the degree of support based on at least information associated with a first number of the first users and a second number of the second users.

4. The method of claim 3 wherein the matching degree includes a degree of trust;
the method further includes:
obtaining one or more third users among the second users, third operation records related to the third users matching with the recommended operations; and
calculating the degree of trust based on at least information associated with a third number of the third users and the second number.

5. The method of claim 4 wherein the matching degree includes a degree of doubt;
the method further includes:
obtaining one or more second operations different from the recommended operations corresponding to the scanning information;
obtaining one or more fourth users among the second users, fourth operation records related to the fourth users matching with the second operations; and
calculating the degree of doubt based on at least information associated with a fourth number of the fourth users and the second number.

6. The method of claim 5 wherein the updating the scanning rules based on information associated with the matching degree includes:
replacing the recommended operations with the second operations, in response to:
the degree of support being larger than a support threshold,
the degree of trust being smaller than a trust threshold, and
the degree of doubt being larger than a doubt threshold.

7. The method of claim 5, further comprising, updating the first number, the second number, a fifth number of one or more fifth users selecting a trust operation, and a sixth number of one or more sixth users selecting a removal operation, based on at least information associated with the first operation records.

8. The method of claim 1, wherein the predetermined validation information does not exist if the contents being scanned are unknown or newly created.

9. The method of claim 1, wherein the scanning information is generated by processing the contents based on one or more validation rules.

10. The method of claim 1, wherein the first operation records are generated and uploaded if the scanning information indicates the security risks.

11. A processor-implemented system for updating one or more scanning rules for scanning contents to detect security risks, the system comprising:
one or more data processors; and
one or more non-transitory computer-readable storage media encoded with instructions for commanding the one or more data processors to execute operations including:
obtaining one or more first operation records to extract scanning information related to contents being scanned to detect security risks, the first operation records including one or more user selected operations related to the contents being scanned;
obtaining one or more recommended operations corresponding to the scanning information based on at least information associated with one or more scanning rules;
determining whether predetermined validation information corresponding to the scanning information exists;
in response to the predetermined validation information existing, determining whether the scanning information and the predetermined validation information matches;
wherein the obtaining one or more recommended operations includes:
in response to the scanning information matching with the predetermined validation information, obtaining a removal operation as the recommended operations; and
in response to the scanning information not matching with the predetermined validation information, obtaining a trust operation as the recommended operations;
in response to the predetermined validation information not existing,
determining one or more first users selecting the trust operation;
determining one or more second users selecting the removal operation; and
obtaining the recommended operations based at least in part on the first users and the second users;
wherein the obtaining the recommended operations based at least in part on the first users and the second users includes:
obtaining one or more third users associated with a user type related to the first operation records;
obtaining one or more fourth users among the third users, second operation records related to the event users corresponding to the scanning information;
calculating a first ratio between a first number of the first users and a fourth number of the fourth users;
calculating a second ratio between a second number of the second users and the fourth number;
applying one or more first weights to the first ratio to generate a first weight ratio;
applying one or more second weights to the second ratio to generate a second weight ratio;
calculating a difference between the first weight ratio and the second weight ratio; and
determining the recommended operations based at least in part on the difference between the first weight ratio and the second weight ratio;
calculating a matching degree between the first operation records and the recommended operations based at least in part on a comparison between the user selected operations and the recommended operations; and
updating the scanning rules based on information associated with the matching degree.

12. The system of claim 11 wherein:
the recommended operations include a removal operation if the scanning information matches with the predetermined validation information; and
the recommended operations include a trust operation if the scanning information does not match with the predetermined validation information, the removal operation being different from the trust operation.

13. The system of claim 11 wherein:
the matching degree includes a degree of support; and
the calculating a matching degree between the first operation records and the recommended operations includes:
   obtaining one or more first users associated with a user type related to the first operation records;
   obtaining one or more second users among the first users, second operation records related to the second users corresponding to the scanning information; and
   calculating the degree of support based on at least information associated with a first number of the first users and a second number of the second users.

14. The system of claim 13 wherein:
the matching degree includes a degree of trust;
the instructions are adapted to command the one or more data processors to perform further operations including:
   obtaining one or more third users among the second users, third operation records related to the third users matching with the recommended operations; and
   calculating the degree of trust based on at least information associated with a third number of the third users and the second number.

15. The system of claim 14 wherein:
the matching degree includes a degree of doubt;
the instructions are adapted to command the one or more data processors to perform further operations including:
   obtaining one or more second operations different from the recommended operations corresponding to the scanning information;
   obtaining one or more fourth users among the second users, fourth operation records related to the fourth users matching with the second operations; and
   calculating the degree of doubt based on at least information associated with a fourth number of the fourth users and the second number.

16. A non-transitory computer readable storage medium comprising instructions for updating one or more scanning rules for scanning contents to detect security risks, the instructions being configured to cause one or more data processors to execute operations comprising:
   obtaining one or more first operation records to extract scanning information related to contents being scanned to detect security risks, the first operation records including one or more user selected operations related to the contents being scanned;
   obtaining one or more recommended operations corresponding to the scanning information based on at least information associated with one or more scanning rules;
   determining whether predetermined validation information corresponding to the scanning information exists;
   in response to the predetermined validation information existing, determining whether the scanning information and the predetermined validation information matches;
   wherein the obtaining one or more recommended operations includes:
      in response to the scanning information matching with the predetermined validation information, obtaining a removal operation as the recommended operations; and
      in response to the scanning information not matching with the predetermined validation information, obtaining a trust operation as the recommended operations;
   in response to the predetermined validation information not existing,
      determining one or more first users selecting the trust operation;
      determining one or more second users selecting the removal operation; and
      obtaining the recommended operations based at least in part on the first users and the second users;
   wherein the obtaining the recommended operations based at least in part on the first users and the second users includes:
      obtaining one or more third users associated with a user type related to the first operation records;
      obtaining one or more fourth users among the third users, second operation records related to the event users corresponding to the scanning information;
      calculating a first ratio between a first number of the first users and a fourth number of the fourth users;
      calculating a second ratio between a second number of the second users and the fourth number;
      applying one or more first weights to the first ratio to generate a first weight ratio;
      applying one or more second weights to the second ratio to generate a second weight ratio;
      calculating a difference between the first weight ratio and the second weight ratio; and
      determining the recommended operations based at least in part on the difference between the first weight ratio and the second weight ratio;
   calculating a matching degree between the first operation records and the recommended operations based at least in part on a comparison between the user selected operations and the recommended operations; and
   updating the scanning rules based on information associated with the matching degree.

* * * * *